United States Patent [19]
Sweatman et al.

[11] Patent Number: 6,060,434
[45] Date of Patent: May 9, 2000

[54] OIL BASED COMPOSITIONS FOR SEALING SUBTERRANEAN ZONES AND METHODS

[75] Inventors: Ronald E. Sweatman, Montgomery; Archie J. Felio, League City; James F. Heathman, Houston, all of Tex.

[73] Assignee: Halliburton Energy Services, Inc., Duncan, Okla.

[21] Appl. No.: 08/818,969

[22] Filed: Mar. 14, 1997

[51] Int. Cl.[7] .............................. C09K 7/06; E21B 33/13
[52] U.S. Cl. ...................... 507/216; 507/203; 507/209; 507/213; 507/214; 507/215; 507/216; 507/901; 166/293
[58] Field of Search .................................. 507/112, 113, 507/114, 110, 209, 213, 214, 215, 216, 203, 901; 166/293

[56] References Cited

U.S. PATENT DOCUMENTS

| | | | |
|---|---|---|---|
| 2,637,692 | 5/1953 | Nahin | 252/8.5 |
| 2,675,353 | 4/1954 | Dawson | 252/8.5 |
| 3,082,823 | 3/1963 | Hower | 166/29 |
| 3,467,208 | 9/1969 | Kelly | 175/72 |
| 3,724,564 | 4/1973 | Messenger | 175/75 |
| 4,173,999 | 11/1979 | Messenger | 166/293 |
| 4,360,120 | 11/1982 | Samuel et al. | 524/494 |
| 4,368,828 | 1/1983 | Sameul et al. | 220/81 R |
| 4,383,054 | 5/1983 | Schulze et al. | 523/131 |
| 4,397,354 | 8/1983 | Dawson et al. | 166/294 |
| 4,439,328 | 3/1984 | Moity | 252/8.5 LC |
| 4,442,241 | 4/1984 | Drake et al. | 523/130 |
| 4,503,170 | 3/1985 | Drake et al. | 166/293 |
| 4,566,977 | 1/1986 | Hatfield | 252/8.5 C |
| 4,633,950 | 1/1987 | Delhommer et al. | 166/295 |
| 4,643,255 | 2/1987 | Sandiford | 166/295 |
| 4,740,319 | 4/1988 | Patel et al. | 252/8.515 |
| 4,836,940 | 6/1989 | Alexander | 252/8.512 |
| 5,151,131 | 9/1992 | Burkhalter et al. | 106/822 |
| 5,306,739 | 4/1994 | Lucey | 522/42 |
| 5,372,641 | 12/1994 | Carpenter | 106/714 |
| 5,447,197 | 9/1995 | Rae et al. | 166/293 |
| 5,458,195 | 10/1995 | Totten et al. | 166/293 |
| 5,476,142 | 12/1995 | Kajita | 166/292 |
| 5,547,506 | 8/1996 | Rae et al. | 106/730 |
| 5,569,324 | 10/1996 | Totten et al. | 106/696 |
| 5,588,488 | 12/1996 | Vijn et al. | 166/293 |
| 5,629,270 | 5/1997 | Van Slyke | 507/112 |
| 5,663,123 | 9/1997 | Goodhue et al. | 507/225 |
| 5,688,844 | 11/1997 | Chatterji et al. | 524/8 |
| 5,795,924 | 8/1998 | Chatterji et al. | 523/130 |

FOREIGN PATENT DOCUMENTS

| | | |
|---|---|---|
| 0 280 341 | 8/1988 | European Pat. Off. . |
| 3135892 | 9/1981 | Germany . |
| 2 108 175 | 11/1983 | United Kingdom . |
| WO 81/00874 | 4/1981 | WIPO . |
| WO 96/00762 | 1/1996 | WIPO . |

*Primary Examiner*—Philip Tucker
*Attorney, Agent, or Firm*—Craig W. Roddy; C. Clark Dougherty, Jr.

[57] ABSTRACT

The present invention provides oil based compositions and methods of using the compositions for sealing subterranean zones. The compositions are basically comprised of oil, a hydratable polymer, an organophillic clay and a water-swellable clay.

23 Claims, No Drawings

OIL BASED COMPOSITIONS FOR SEALING SUBTERRANEAN ZONES AND METHODS

BACKGROUND OF THE INVENTION

1. Field of the Invention

The present invention relates to improved oil based compositions for sealing subterranean zones and methods of utilizing the compositions.

2. Description of the Prior Art

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures and other thief zones are often encountered whereby the drilling fluid circulation is lost and drilling operations must be terminated while remedial steps are taken. Also, when a subterranean zone is penetrated containing fluids under pressure which exceeds the hydrostatic pressure exerted on the zone by the drilling fluid, formation fluid crossflows and/or underground blow-outs can and often do occur.

Heretofore, a variety of compositions have been developed and used for combatting lost circulation, crossflow and underground blow-out problems. However, such compositions have often been unsuccessful due to delayed and inadequate viscosity development by the compositions. For example, a variety of cement compositions have been used in attempts to stop lost circulation. The lost circulation is usually the result of encountering weak subterranean zones that contain natural fractures or are fractured by drilling fluid pressures and rapidly break down. When a cement or other slow setting composition is squeezed into the zone, the delay in developing high viscosity allows the composition to be diluted and displaced deeply into the zone whereby it bypasses the fractures and vugs causing the lost circulation. The same type of problem often occurs when crosslinked hydrated gels and other similar plugging compositions are utilized.

Thus, there is a need for improved compositions and methods for sealing subterranean zones that develop ultra high viscosity in a few seconds or minutes instead of the longer times heretofore required for sealing compositions to reach plugging viscosity.

SUMMARY OF THE INVENTION

Improved oil based compositions for sealing subterranean zones and methods of using the compositions are provided which overcome the deficiencies of the prior art and meet the needs described above. The compositions are basically comprised of oil, a hydratable polymer, an organophillic clay and a water swellable clay. The compositions can also include cross-linking agents, dispersing agents, cement, fillers and the like.

When the sealing compositions of this invention contact water in the well bore, the hydratable polymer reacts with the water whereby it is hydrated and forms a highly viscous gel and the water swellable clay swells whereby an ultra high viscosity mass is formed. The organophillic clay adds viscosity to the sealing composition when it is formed, i.e., it reacts with the oil carrier fluid and prevents the polymer and water swellable clay from settling out of the composition.

A preferred composition of this invention is comprised of diesel oil present in the composition in an amount in the range of from about 32% to about 62% by weight of the composition, hydroxyethylcellulose present in an amount in the range of from about 3% to about 6% by weight of the composition, alkyl quaternary ammonium bentonite present in an amount in the range of from about 0.3% to about 0.6% by weight of the composition and water swellable bentonite clay present in an amount in the range of from about 34% to about 62% by weight of the composition.

The methods of the invention comprise the steps of preparing a sealing composition of this invention and then introducing it into the subterranean zone to be sealed.

It is, therefore, a general object of the present invention to provide improved oil based compositions for sealing subterranean zones and methods.

Other and further objects, features and advantages of the present invention will be readily apparent to those skilled in the art upon a reading of the description of preferred embodiments which follows.

DESCRIPTION OF PREFERRED EMBODIMENTS

As mentioned above, in the drilling of wells, subterranean zones are often encountered which contain high incidences of natural vugs and fractures. As a result, drilling fluid circulation is often lost which requires the termination of the drilling and the implementation of remedial procedures which are often of long duration and high cost. Such remedial procedures have heretofore involved the placement of hardenable compositions such as Portland cement compositions or crosslinked stiff gels or the like in the lost circulation zone. However, as mentioned above, because such compositions require considerable time to harden or gel and/or are easily washed out, successful plugging of the zone often does not take place. In addition to drilling fluid lost circulation zones, zones containing pressurized fluids can be encountered which cause gas, oil or water crossflows that dilute and wash away sealing compositions. Also, underground blow-outs at low to high formation fluid flow rates can take place.

The present invention provides improved oil based compositions for sealing subterranean zones and terminating the loss of drilling fluid, crossflows and/or underground blow-outs. When a composition of this invention contacts water in the well bore it immediately forms a resilient sealing mass having ultra high viscosity. As the sealing mass is displaced through the well bore, it enters and seals thief zones such as vugs and fractures through which fluid is lost. A flexible seal is obtained by a combination of extrusion pressure and friction pressure.

The sealing compositions of this invention are self diverting and plug multiple weak zones in a single well treatment. When a well contains a crossflow or underground blow-out, the high viscosity sealing compositions plug all the lower pressure weak zones penetrated by the well bore and as the pressure in the well bore is increased, the crossflow or blow-out zone is plugged. The resultant sealed well bore achieved by the sealing compositions of this invention can hold higher drill-ahead drilling fluid weights and produce a wedging effect in plugged fractures that increases the integrity of the entire formation or zone.

The portion of a sealing composition left in the well bore after sealing one or more zones therein remains movable to divert to other zones above or below the sealed zones. The sealing mass is not readily diluted or washed away by crossflows as are most prior art compositions.

The sealing compositions of the present invention are basically comprised of oil, a hydratable polymer, an organophillic clay and a water swellable clay. The hydratable polymer reacts with water in the well bore and is immediately hydrated whereby a highly viscous gel is formed. The water swellable clay immediately swells in the presence of water and together with the viscous gel forms a highly viscous sealing mass. The organophillic clay reacts with the oil carrier fluid to add viscosity to the composition so that the polymer and clay do not settle out of the oil prior to reacting with water in the well bore.

The oil utilized in accordance with this invention can be any oil which does not adversely react with other components of the sealing compositions and reacts with organophillic clays to bring about an increase in the viscosity of the compositions prior to contacting water. The term "oil" is used herein to mean non-aqueous liquids including, for example, diesel oil, mineral oils, kerosene, vegetable oils, synthetic oils, esters, olefins and the like. Of these, diesel oil is preferred. The oil used is generally included in the sealing compositions of this invention in an amount in the range of from about 32% to about 62% by weight of the compositions. When diesel oil is used, it is preferably included in the composition in an amount in the range of from about 43% to about 53%.

A variety of well known hydratable polymers can be utilized in accordance with the present invention. Generally, they include hydratable polymers which contain one or more of the functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. Hydratable synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol and polyvinylpyrrolidone.

Preferred hydratable polymers for use in accordance with this invention which yield high viscosities upon hydration include one or more of guar gum and guar derivatives such as hydroxypropylguar and carboxymethylguar, cellulose derivatives such as hydroxyethylcellulose carboxymethylcellulose and carboxymethylhydroxyethylcellulose, locust bean gum, carrageenan gum and xanthan gum. Of these, the most preferred is hydroxyethylcellulose. The hydratable polymer or polymers used are included in the sealing compositions of this invention in an amount in the range of from about 3% to about 6% by weight of the compositions, more preferably from about 4% to about 5%.

The viscosities of the polymers when hydrated in water can be increased by combining crosslinking agents with the polymer solutions. Examples of crosslinking agents which can be utilized are multivalent metal salts or compounds which are capable of releasing the metal ions in an aqueous solution. Examples of such multivalent metal ions are chromium, zirconium, antimony, titanium, iron (ferrous or ferric), zinc or aluminum. When used, a crosslinking agent as described above is included in the sealing compositions of this invention in an amount in the range of from about 0.1% to about 3% by weight of the compositions, more preferably from about 0.1% to about 1%.

While a variety of organophillic clays can be utilized, an alkyl quaternary ammonium bentonite clay is preferred. A particularly suitable alkyl quaternary ammonium bentonite clay for use in accordance with the present invention is commercially available from Southern Clay Products, Inc. of Gonzales, Tex. under the tradename "CLAYTONE-II™." The organophillic clay is generally present in the compositions of this invention in an amount in the range of from about 0.3% to about 0.6% by weight of the compositions, more preferably from about 0.4% to about 0.5%.

The water swellable clay can be one or more clays selected from montmorillonite, attapulgite, Fuller's earth, bentonite and the like. Of these, bentonite is preferred. The water swellable clay is present in the sealing compositions in an amount in the range of from about 34% to about 62% by weight of the compositions, more preferably from 42% to about 53%.

In order to facilitate the dispersal of the solid materials, i.e., the hydratable polymer, the organophillic clay and the water swellable clay, in the oil carrier fluid used, an effective amount of a dispersing agent can be included in the sealing compositions. Various dispersing surfactants can be utilized including lecithin, aminododecylbenzene sulfonate, aryl alkyl sodium sulfonate, imodazolin and others. Of these, lecithin is preferred.

Inert fillers can be included in the sealing compositions to increase the downhole yield of the compositions and/or provide additional hardness to the compositions. Examples of such fillers are silica flour, silica fume, pozzolans and the like. Hardenable hydraulic materials such as Portland cement and slag can also be added to the sealing compositions to alter and/or enhance the properties of the sealing masses formed when the sealing compositions contact water in a well bore.

The sealing compositions can also be foamed with nitrogen or other suitable gas in the presence of a foaming agent for reducing the densities of the compositions, preventing fluid loss and aiding in the diversion of the compositions into zones to be sealed. A suitable foaming agent which can be used is a fluorocarbon surfactant comprised of a copolymer of the following two monomers:

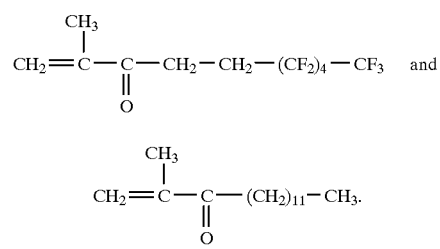

Other additives which are well known to those skilled in the art can also be included in the compositions.

A particularly preferred sealing composition of this invention is comprised of diesel oil present in an amount in the range of from about 43% to about 53% by weight of the composition, hydroxyethylcellulose present in an amount in the range of from about 4% to about 5% by weight of the composition, an alkyl quaternary ammonium bentonite clay present in an amount in the range of from about 0.4% to about 0.5% by weight of the composition and water swellable bentonite present in an amount in the range of from about 42% to about 53% by weight of the composition.

The sealing compositions of this invention can be prepared in accordance with any of the well known mixing techniques. In a preferred method, the oil used is first introduced into a blender. The dispersant and other liquid additives are then added followed by the hydratable polymer, organophillic clay, water swellable clay and other dry solids. The mixture is agitated for a sufficient period of time to mix the components and form a pumpable slurry.

The methods of this invention for sealing a subterranean zone to prevent the uncontrolled flow of fluids into or from the zone basically comprise the steps of preparing a subterranean zone sealing composition of this invention comprising oil, a hydratable polymer, an organophillic clay and a water swellable clay, and then introducing the sealing composition into the zone to be sealed. Generally, the sealing composition is prepared in mixing apparatus at the surface and then pumped down the well bore into the zone to be sealed at a high pressure whereby the sealing mass formed in the well bore is squeezed into fractures and vugs therein. A fluid pressure above the fracture gradient of the zone can also be used in some applications to fracture the zone being sealed and force the sealing composition into the fractures thereby increasing the overall strength of the zone. As mentioned, the sealing composition enters the weakest portions of the zone first followed by other portions including those where fluids crossflow through the well bore or blow-out into the well bore. The sealing composition stops drilling fluid losses and allows high drilling fluid densities to be utilized when needed while drilling ahead. Once the sealing composition has been placed, it increases the fracture gradient to a higher value that can eliminate the need for intermediate casing, drilling liners and the like. Because the sealing composition readily diverts to other weak zones in the well bore, the integrity of the entire well bore is improved by the sealing composition.

In order to further illustrate the compositions and methods of the present invention, the following examples are given.

EXAMPLE 1

An oil based sealing composition of the present invention comprised of diesel oil present in an amount in the range of from about 43% to about 53%, hydroxyethylcellulose present in an amount in the range of from about 4% to about 5%, an alkyl quaternary ammonium bentonite clay present in an amount in the range of from about 0.4% to about 0.5% and water swellable bentonite clay present in an amount in the range of from about 42% to about 53%, all by weight of the composition was prepared in the laboratory. A portion of the sealing composition was added to an equal portion of a water based drilling fluid. Within about 10 seconds a solid high viscosity mass was formed which had a moldable consistency.

EXAMPLE 2

In a well being drilled with water based drilling fluid, a highly permeable and/or fractured zone was encountered whereby about 60 barrels per hour of the drilling fluid were being lost. An oil based sealing composition as described in Example 1 above was prepared. Equal portions of the composition were pumped down the drill pipe and down the annulus, each at a rate of one barrel per minute. As the composition reacted with the water based drilling fluid in the well bore, high viscosity resilient masses were formed which entered and sealed the highly permeable and/or fractured zones through which the drilling fluid losses occurred whereupon drilling was resumed.

Thus, the present invention is well adapted to carry out the objects and attain the benefits and advantages mentioned as well as those which are inherent therein. While numerous changes to the compositions and methods can be made by those skilled in the art, such changes are encompassed within the spirit of this invention as defined by the appended claims.

What is claimed is:

1. A composition for sealing a subterranean zone to prevent the uncontrolled flow of fluids into or from the zone consisting essentially of oil present in an amount in the range of from about 32% to about 62% by weight of said composition;

a hydratable polymer present in an amount in the range of from about 3% to about 6% by weight of said composition;

an organophillic clay present in an amount in the range of from about 0.3% to about 0.6% by weight of said composition; and a water swellable clay present in an amount in the range of from about 34% to about 62% by weight of said composition.

2. The composition of claim 1 wherein said oil is selected from the group consisting of diesel oil, mineral oils, kerosene, vegetable oils and synthetic oils, esters and olefins.

3. The composition of claim 1 wherein said oil is diesel oil.

4. The composition of claim 1 wherein said hydratable polymer is selected from the group consisting of one or more of guar gum, hydroxypropylguar, carboxymethylguar, hydroxyethylcellulose, carboxymethylcellulose, carboxymethylhydroxyethylcellulose, locust bean gum, carrageenan gum and xanthan gum.

5. The composition of claim 1 wherein said hydratable polymer is hydroxyethylcellulose.

6. The composition of claim 1 wherein said organophillic clay is an alkyl quaternary ammonium bentonite.

7. The composition of claim 1 wherein said water-swellable clay is selected from the group consisting of montmorillonite, attapulgite, Fuller's earth and bentonite.

8. The composition of claim 1 wherein said water-swellable clay is bentonite.

9. The composition of claim 1 which further comprises an effective amount of a dispersing agent.

10. The composition of claim 9 wherein the dispersing agent is lecithin.

11. A composition for sealing a subterranean zone to prevent the uncontrolled flow of fluids into or from the zone consisting essentially of:

diesel oil present in an amount in the range of from about 32% to about 62% by weight of said composition;

hydroxyethylcellulose present in an amount in the range of from about 3% to about 6% by weight of said composition;

an alkyl quaternary ammonium bentonite clay present in an amount in the range of from about 0.3% to about 0.6% by weight of said composition; and water-swellable bentonite present in an amount in the range of from about 34% to about 62% by weight of said composition.

12. The composition of claim 11 wherein said diesel oil is present in an amount in the range of from about 43% to about 53% by weight of said composition.

13. The composition of claim 12 wherein said hydroxyethylcellulose is present in an amount in the range of from about 4% to about 5% by weight of said composition.

14. The composition of claim 13 wherein said alkyl quaternary ammonium bentonite clay is present in an amount in the range of from about 0.4% to about 0.5% by weight of said composition.

15. The composition of claim 14 wherein said water swellable bentonite is present in an amount in the range of from about 42% to about 53% by weight of said composition.

16. A method of sealing a subterranean zone to prevent the uncontrolled flow of fluids into or from the zone comprising the steps of:

preparing a subterranean zone sealing composition consisting essentially of oil, a hydratable polymer, an organophillic clay and a water-swellable clay; and introducing said sealing composition into said zone.

17. The method of claim 16 wherein said oil is selected from the group consisting of diesel oil, mineral oils, kerosene, vegetable oils and synthetic oils, esters and olefins and is present in an amount in the range of from about 32% to about 62% by weight of said composition.

18. The method of claim 17 wherein said oil is diesel oil.

19. The method of claim 17 wherein said hydratable polymer is selected from the group consisting of one or more of guar gum, hydroxypropylguar, carboxymethylguar, hydroxyethylcellulose, carboxymethylcellulose, carboxymethylhydroxyethylcellulose, locust bean gum, carrageenan gum and xanthan gum and is present in an amount in the range of from about 3% to about 6% by weight of said composition.

20. The method of claim 19 wherein said hydratable polymer is hydroxyethylcellulose.

21. The method of claim 19 wherein said organophillic clay is an alkyl quaternary alkyl quaternary ammonium bentonite clay, and is present in an amount in the range of from about 0.3% to about 0.6% by weight of said composition.

22. The method of claim 21 wherein said water-swellable clay is selected from the group consisting of montmorillonite, attapulgite, Fuller's earth and bentonite and is present in an amount in the range of from about 34% to about 62% by weight of said composition.

23. The method of claim 22 wherein said water-swellable clay is bentonite.

* * * * *